Patented July 17, 1951

2,561,154

UNITED STATES PATENT OFFICE 2,561,154

SOLUBLE TERNARY COPOLYMERS OF STYRENE, ALLYLIC POLY-2-ALKENYL ESTERS, AND ALLYLIC MONOETHERS

Pliny O. Tawney, Passaic, N. J., assignor to United States Rubber Company, New York, N. Y., a corporation of New Jersey No Drawing. Application June 29, 1948,
Serial No. 35,982

2 Claims. (Cl. 260—78.5)

The invention relates to a new class of soluble, unsaturated ternary interpolymers of a poly-2-propenyl ester of a polybasic acid with styrene or a substituted styrene, as hereafter defined, and a 2-propenyl monoether of a non-enic alcohol or a 2-propenyl monoester of a non-enic carboxylic acid. These new resins are capable of being converted to an insoluble and essentially infusible state by further polymerization or copolymerization.

Copolymers of styrene with poly-2-alkenyl esters such as diallyl fumarate, diallyl oxalate, and dimethallyl carbonate, are of interest to the plastics industry in the preparation of solvent-resistant castings of a high degree of optical clarity and for use as surface coatings. However, as is well known, during the preparation of such copolymers the reaction mixture gels before more than minor amounts of the monomeric starting materials have been converted to the copolymeric form. The reaction mixture, which usually consists of heterogeneous mixture of insoluble gel, low molecular weight copolymers and unreacted monomers, is poorly adapted to subsequent processing operations and indeed is of little or no use in many commercial applications, e. g., impregnating, coating and molding, for such industrial operations require a uniform and initially soluble, fusible resin which after application can be cured to an insoluble and infusible state. By halting the polymerization before gelation occurs, a small amount of a soluble copolymer can be obtained, but it must be purified to remove unreacted starting materials and the latter must likewise be isolated, purified and then recycled for use in subsequent copolymerizations. It has been proposed to alleviate the economic disadvantages of such a process by improving the conversion of the monomeric styrene and poly-2-alkenyl ester to the soluble copolymeric form by various methods which include carrying out the reaction at high temperatures and/or in the presence of large amounts of diluents, catalysts, inhibitors, etc. Actually such devices have only a limited and in many cases an insignificant effect. Moreover, the product must be subjected to further and expensive purification operations to remove such solvents, inhibitors and catalyst fragments in order to retain the desirable properties of the resin.

I have now unexpectedly discovered that the difficulties encountered by the prior art in the copolymerization of styrene with a poly-2-alkenyl ester can be successfully overcome by carrying out the copolymerization in the presence of an interpolymerizable 2-alkenyl monoether or monoester as defined above. In further contrast to the prior art, my interpolymerization reaction proceeds readily at moderate temperatures and in the absence of any special reaction condition or precautions heretofore employed in attempts to delay or avert gelation. Moreover, since my new ternary interpolymers are more uniform and homogeneous in character, elaborate and expensive purification procedures are usually unnecessary.

My acetone-soluble interpolymers are to be understood as distinctive from the homopolymers of each of the monomers in that my interpolymers each consist of a substantial number or plurality of recurring units of the chemical elements of each of the monomers which are chemically combined in the interpolymer.

My new ternary interpolymers are superior to binary interpolymers of poly-2-alkenyl esters and 2-alkenyl monoethers or monoesters in that they provide softer resins of improved molding properties and increased compatibility with the cheap hydrocarbon solvents employed as "thinners" in the coating industry.

The copolymerizable 2-alkenyl monoethers and monoesters which are useful in my invention can be represented by the type formula $RCH=CR-CH_2X$, wherein one R is H and the other R is selected from the class consisting of methyl, ethyl, chlorine, cloromethyl, and phenyl; and X is selected from the class consisting of alkoxy (e. g., methoxy, ethoxy, beta-hydroxyethoxy, propoxy, isopropoxy, butoxy, amyloxy, hexoxy, cyclohexoxy, and decoxy), aryloxy (e. g., phonoxy, p-chlorophenoxy, tolyloxy, and naphthoxy), aralkoxy (e. g., benzyloxy, and beta-phenylethoxy), and acyloxy in which the acyl group is devoid of olefinic and acetylenic unsaturation (e. g., acetoxy, propionoxy, butyroxy, isobutyroxy, valeryloxy, caproyloxy and benzoyloxy). Illustrative of such compounds are allyl methyl ether, methallyl ethyl ether, 2-chloroallyl octyl ether, 2-ethallyl decyl ether, methallyl phenyl ether, allyl benzyl ether, allyl acetate, allyl chloroactetate, methallyl propionate, 2-chloroallyl butyrate, allyl capryate, allyl benzoate and methallyl p-chlorobenzoate. Preferably it is the terminal R which is H.

The 2-alkenyl monoethers tend, with few exceptions, to be more effective than the 2-alkenyl esters in averting gelation of the copolymerizing mixture of poly-2-alkenyl ester and styrene; they also yield interpolymers of optimum resistance to wetting and attack by hydroxylic solvents such as water and alcohol, although the 2-alkenyl monoesters are nearly equivalent to the 2-alkenyl monoethers in this latter respect. Both the 2-alkenyl monoethers and the monoesters are useful in endowing the interpolymers with improved flexibility and this can be enhanced by using the 2-alkenyl ethers and esters of long chain alcohols and long chain carboxylic acids, respectively.

I have found that in the practice of my invention the presence of as little as 0.2 mole of the interpolymerizable 2-alkenyl monoether or monoester per mole of the poly-2-alkenyl ester is sufficient to effect a marked increase in the conversion of the latter monomer as well as the styrene to the soluble, interpolymeric form. As the proportion of the 2-alkenyl monoether or monoester in the initial reaction mixture is increased to about 3–5 moles, the major proportions of both the styrene and the poly-2-alkenyl ester can be converted to the soluble interpolymeric form, and even higher yields may be obtained as the amount of the 2-alkenyl monoether or monoester is further increased up to 7 moles.

The styrene employed in my invention may be replaced in whole or in part by a substituted styrene from the class consisting of alpha-methylstyrene, p-methylstyrene, p-methoxystyrene, p-chlorostyrene, o,p-dichlorostyrene, p-(trichloromethyl)styrene, p-fluorostyrene, p-(trifluoromethyl)styrene.

The poly-2-alkenyl esters which are operable in my invention are the esters of polybasic acids with 2-alkenyl alcohols including allyl, 2-methallyl, 2-ethallyl, 2-chloroallyl, 2-(hydroxymethyl)allyl, 2-(chloromethyl)allyl, tiglyl, crotyl, 4-chlorocrotyl, and cinnamyl alcohols, of which those containing the terminal methylene group are preferred, e. g., allyl, methallyl, and ethallyl alcohols.

A preferred class of poly-2-alkenyl esters are those derived from olefinic polycarboxylic acids, particularly alpha-olefinic polycarboxylic acids such as fumaric, itaconic, maleic, mesaconic, citraconic, and aconitic acid. Of these, the poly-2-alkenyl fumarates, e. g., diallyl fumarate, are especially preferred because of their availability, cheapness, the speed with which they interpolymerize according to my invention, and the high yields of soluble interpolymeric products obtainable therefrom.

Another class of poly-2-alkenyl esters are those derived from the non-enic polybasic acids, e. g., oxalic, malonic, succinic, glutaric, adipic, sebacic, azelaic, tricarballylic, sulfuric, carbonic, phosphoric and silicic acids, e. g., diallyl oxalate, di-2-chlorallyl succinate, diallyl adipate, dimethallyl carbonate, triallyl phosphate and tetramethallyl silicate. While the poly-2-alkenyl esters of this class are operable in my invention, they tend to yield products which are of considerably lower molecular weight and which are less uniform in character. Moreover, the resulting interpolymers require much more stringent curing in order to achieve a satisfactory degree of thermostability and solvent resistance in the final product.

The method of my invention comprises heating a poly-2-alkenyl ester with from 0.2 to 6.0 or more molar equivalents of styrene or a substituted styrene and from 0.2 to 14.0, preferably 2.0–10, molar equivalents of the 2-alkenyl monoether or monoester. The reaction can be carried out at temperatures in the range of from 25° to 125° C., preferably 50° to 110° C., for times sufficient to secure an adequate degree of reaction, such times being usually within the range of from 2 to 200 hours and frequently in the range of 2 to 150 hours. The reaction is promoted by free radicals including peroxidic compounds such as benzoyl peroxide, acetyl peroxide and tertiary-butyl hydroperoxide, such promoters being ordinarily employed in amounts of from 0.1 to 15%, and usually 0.1 to 10%, by weight of the reactant mixture. The course of the reaction can be followed by determining from time to time the increase in the viscosity of the reaction mixture. The interpolymer is isolated by precipitation through addition of a non-solvent or by removing any unreacted starting materials by extraction or distillation. Although it is unnecessary for the majority of commercial applications, the interpolymer may be further purified if desired, e. g., for analytical purposes or for optical applications, by dissolving it in a minimum volume of the solvent such as acetone and reprecipitating it by the addition of a non-solvent, e. g., n-hexane.

My new interpolymers can be employed in the solid form as thermosetting molding powders for the preparation of various industrial shapes including rods, blocks, and sheets. They may be also employed as coating, laminating and impregnating compositions by dissolving them in appropriate solvents. For such purposes the crude interpolymerization reaction mixtures can themselves be employed by the addition of higher-boiling solvents and subsequent distillation to remove any of the unreacted 2-alkenyl monoether or monoester. My interpolymers can likewise be dissolved in a number of liquid ethylenically unsaturated copolymerizable compounds, e. g., methyl acrylate, butyl acrylate, benzyl acrylate, diethyl fumarate, vinyl butyrate, diallyl fumarate and allyl acrylate, to yield solutions capable of being totally polymerized without leaving any solvent to be evaporated. The latter are of particular interest in applications where removal of a diluent from a coating or impregnating composition is uneconomical or provides a technical or a health hazard. These solutions are likewise useeful in molding operations where an initially fluid composition is required which can be ultimately set or cured in a final shape with a minimum of shrinkage.

Heating compositions containing my interpolymers at such temperatures as 60–150° C., or higher, particularly in the presence of catalysts, induces further polymerization whereby the products are rendered substantially infusible as well as resistant to attack by solvents such as acetone and xylene. Suitable inert addends including dyes, pigments, fillers and plasticizers can be incorporated with my new interpolymers preferably in the soluble, fusible stage prior to the final cure.

The following examples disclose my invention in more detail. All parts are by weight.

EXAMPLE 1

Ternary mixtures of styrene with various poly-2-alkenyl esters and 2-alkenyl monoethers and monoesters are heated at 60° C. in the presence of benzoyl peroxide as a promoter until in each case the point of incipient gelation is attained or until no further increase in the viscosity of the reaction mixture is detectable. The reaction mixtures are then diluted with an excess of n-hexane and the precipitated materials are further purified by repeated solution in a minimum volume of acetone and precipitation with an excess of n-hexane. The products are finally dried in vacuo to constant weight.

In Table I below are summarized the amounts of the starting materials, of peroxide, and of polymeric product obtained; and to emphasize the advantages of my invention, the copolymerization of styrene with various 2-alkenyl esters according to the prior art, i. e., in the absence of my 2-alkenyl monoethers and monoesters, is likewise included (I–1, 2, 3, 6, 19, 21, 25).

The analysis corresponds to a ternary interpolymer containing approximately 54.7% by weight of diallyl fumarate, 25.3% of styrene and 20.0% of methallyl ethyl ether. The iodine number indicates the large amount of residual unsaturation which is available in the interpolymer for further polymerization.

(a) Four parts of the interpolymer are dissolved in 4 parts of an 80:20 xylene-butanol mixture containing 0.2 part of carbitol acetate, and the solution is poured onto a glass panel. After Table I

| | Poly-2-Alkenyl Ester | Amt. | 2-Alkenyl Ether or Ester | Amt. | Styrene | Benzoyl Peroxide | Reaction Time (hours) | Polymeric Product |
|---|---|---|---|---|---|---|---|---|
| 1 | Diallyl Fumarate | 100 | | | 25.0 | 2.0 | 3.0 | 13.9 |
| 2 | ----do---- | 100 | | | 46.5 | 2.2 | 12.0 | 17.6 |
| 3 | ----do---- | 100 | | | 53.0 | 1.53 | 2.3 | 18.4 |
| 4 | ----do---- | 100 | Allyl Ethyl Ether | 9.75 | 53.0 | 2.74 | 1.9 | 26.3 |
| 5 | ----do---- | 100 | ----do---- | 21.9 | 53.0 | 3.08 | 2.8 | 35.2 |
| 6 | ----do---- | 100 | (¹) | 21.9 | 53.0 | 3.08 | 2.4 | 25.2 |
| 7 | ----do---- | 100 | Allyl Ethyl Ether | 115.0 | 46.5 | 5.41 | 6.4 | 61.5 |
| 8 | ----do---- | 100 | Methallyl Ethyl Ether | 44.0 | 53.3 | 3.0 | 44.9 | 37.0 |
| 9 | ----do---- | 100 | ----do---- | 102.0 | 53.0 | 4.95 | 4.0 | 47.5 |
| 10 | ----do---- | 100 | ----do---- | 307.0 | 53.0 | 9.90 | 16.2 | 120.0 |
| 11 | ----do---- | 100 | ----do---- | 410.0 | 53.0 | 12.35 | 36.7 | 135.0 |
| 12 | ----do---- | 100 | ----do---- | 578.0 | 53.0 | 12.30 | ² 120.0 | 146.0 |
| 13 | ----do---- | 100 | ----do---- | 134.0 | 46.3 | 5.41 | 11.0 | 62.5 |
| 14 | ----do---- | 100 | Methallyl Acetate | 44.0 | 53.3 | 2.0 | 4.75 | 29.8 |
| 15 | ----do---- | 100 | ----do---- | 100.0 | 53.3 | 2.5 | 5.9 | 40.8 |
| 16 | ----do---- | 100 | ----do---- | 114.0 | 53.3 | 2.5 | 5.95 | 51.0 |
| 17 | ----do---- | 100 | Allyl Acetate | 100.0 | 53.3 | 2.5 | 5.9 | 42.3 |
| 18 | ----do---- | 100 | Methallyl Acetate | 100.0 | 25.0 | 2.0 | 6.3 | 28.6 |
| 19 | Diallyl Itaconate | 100 | | | 25.0 | 0.8 | 6.5 | 18.1 |
| 20 | ----do---- | 100 | Allyl Acetate | 100.0 | 25.0 | 4.0 | 8.2 | 55.9 |
| 21 | ----do---- | 100 | | | 50.0 | 2.3 | 2.1 | 38.5 |
| 22 | ----do---- | 100 | Allyl Acetate | 122 | 50.0 | 4.0 | 11.75 | 95.0 |
| 23 | ----do---- | 100 | Methallyl Acetate | 100 | 25.0 | 2.0 | 14.9 | 51.0 |
| 24 | ----do---- | 100 | Allyl Ethyl Ether | 100 | 25.0 | 4.0 | ² 12.5 | 158.0 |
| 25 | Triallyl Aconitate | 100 | | | 50.0 | 2.8 | ³ 48.0 | 83.0 |
| 26 | ----do---- | 100 | Methallyl Ethyl Ether | 100.0 | 50.0 | ³ 6.0 | ² 120.0 | 93.5 |

¹ The 2-alkenyl ether or ester replaced by benzene.
² No evidence of incipient gelation.
³ Catalyst added in equal increments at 24 hour intervals.

From Table I it is apparent that the copolymerization of a poly-2-alkenyl ester with styrene in the presence of even a small amount of an interpolymerizable 2 - alkenyl monoether or monoester effects a marked increase in the conversion of these monomers to the soluble polymeric form. Succeeding examples show that the conversion of the styrene and the poly-2-alkenyl ester to the soluble interpolymeric form can be further increased as the amount of the 2-alkenyl monoether or monoester in the reaction mixture is increased and that in this manner high yields of such soluble, unsaturated interpolymers can be readily obtained without danger of premature insolubilization.

EXAMPLE 2

A mixture of 78.4 parts of diallyl fumarate, 41.6 parts of styrene, 455 parts of methallyl ethyl ether and 12.0 parts of a 60% solution of tertiary-butyl hydrogen peroxide is heated at reflux for 87 hours. The majority of the unreacted methallyl ethyl ether is removed by evacuating the reaction mixture at 35° C. and 100 mm. pressure in a nitrogen atmosphere and the residual syrup is purified for analytical purposes by pouring it into n-hexane after which the precipitated interpolymer is further purified by repeated solution in acetone and precipitation with n-hexane. After drying in vacuo to constant weight 116 parts of colorless polymeric solid are obtained which is readily soluble in acetone, chloroform, carbon tetrachloride, ethyl acetate and an 80:20 xylene-butanol mixture.

*Analysis.*—Found: C, 71.23%; H, 7.72%; iodine number (Wijs), 118.8.

baking for 20 minutes at 200° C. a clear, colorless film is obtained which is insoluble in acetone.

(b) The interpolymer is cured in the presence of air by dissolving 3 parts of the material in three parts of commercial xylenes containing 0.00195 part of cobalt as cobalt naphthenate. The solution is poured onto a walnut veneer panel and baked for 1 hour at 100° C. to produce a smooth, colorless, glossy film which is tack-free when hot and is insoluble in acetone.

(c) Seven parts of the interpolymer are dissolved in 3.0 parts of diethyl fumarate together with 0.2 part of benzoyl peroxide, and the solution is heated in a mold for 16 hours at 60° C. and then for two hours at 90° C. The resulting product is resistant to heat and solvents and has a Rockwell hardness of L91.

EXAMPLE 3

Fifty-eight and eight tenths parts of diallyl fumarate are dissolved in 361 parts of methallyl ethyl ether together with 62.4 parts of styrene and 10.0 parts of a 60% solution of tertiary-butyl hydrogen peroxide, and the mixture is heated at reflux for 44 hours. The product is isolated and purified as in Example 2 to yield 116.5 parts of colorless, polymeric solid.

*Analysis.*—Found: C, 74.80%; H, 7.46%; iodine number, 113.1.

The analysis corresponds to a ternary interpolymer containing approximately 42.8% by weight of diallyl fumarate, 37.0% of styrene and 20.2% of methallyl ethyl ether. This represents a conversion of approximately 85% by weight of the monomeric diallyl fumarate and 67% of the styrene to the soluble copolymeric form.

(a) The film prepared from this interpolymer in the manner of Example 2–a is clear, colorless and solvent-resistant after baking for 20 minutes at 200° C. Similarly, the interpolymer can be cured by heating in the presence of air, as in Example 2–b above, to yield a clear tack-free film which is insoluble in acetone.

(b) Seven parts of the interpolymer are dissolved in 3.0 parts of n-butyl acrylate together with 0.2 part of benzoyl peroxide, and the solution is heated in a mold for 16 hours at 60° C. and then for two hours at 90° C. The resulting clear product is insoluble and infusible and has a Rockwell hardness of L42. When diethyl fumarate is substituted for the n-butyl acrylate, the resulting solvent and heat-resistant product has Rockwell hardness of L93 and M82.

EXAMPLE 4

A mixture of 39.2 parts of diallyl fumarate, 20.8 parts of styrene, 226 parts of methallyl ethyl ether, and 6.4 parts of benzoyl peroxide is heated at reflux for 14.5 hours in an atmosphere of carbon dioxide. After the usual isolation and purification 64.4 parts of soluble, unsaturated resin are obtained which can be readily converted to the insoluble, infusible state in the manner set forth in previous examples.

EXAMPLE 5

Twenty-six and four tenths parts of diallyl fumarate are dissolved in 200 parts of methallyl 2-ethylhexyl ether together with 14.1 parts of styrene and 2.0 parts of a 60% solution of tertiary-butyl hydrogen peroxide, and the resulting mixture is heated at 120° C. for 24 hours. The product is isolated and purified as in previous examples to yield 46.5 parts of colorless polymeric solid.

*Analysis.*—Found: C, 72.39%; H, 8.12%; iodine number, 122.4.

The analysis corresponds to a ternary interpolymer containing approximately 53.5% by weight of diallyl fumarate, 43.8% of styrene and 22.7% of methallyl 2-ethylhexyl ether. This represents a conversion of approximately 94% by weight of the monomeric diallyl fumarate and 79% of the styrene to the soluble, copolymeric form.

(a) Four parts of the interpolymer are dissolved in 4.0 parts of an 80:20 xylene-butanol mixture containing 0.2 part of carbitol acetate, and the solution is baked on a glass panel for 20 minutes at a 200° C. to yield a clear, colorless, solvent-resistant film. When the film is baked for 16 additional hours at 200° C. it shows a little discoloration and no loss in clarity.

(b) The interpolymer is cured in the presence of air by dissolving three parts of it in three parts of commercial xylenes containing 0.00195 part of dissolved cobalt as cobalt naphthenate. The solution is flowed onto a walnut veneer panel and baked in the presence of air for one hour at 100° C. to yield a clear, adherent, glossy film which is tack-free at 100° C. and insoluble in acetone.

EXAMPLE 6

A mixture of 29.4 parts of diallyl fumarate, 15.6 parts of styrene, 146 parts of allyl ethyl ether and 4.84 parts of a 60% solution of tertiary-butyl hydrogen peroxide is heated at reflux for 14.5 hours.

(a) Twenty-five parts of the crude reaction mixture is evacuated at room temperature and 2 mm. pressure until 6.5 parts of a viscous syrup are obtained. To this are added six parts of xylene, 0.5 part of carbitol acetate and 0.0062 part of cobalt as cobalt naphthenate. The solution is spread on a glass panel and baked at 100° C. The resulting film becomes tack-free in 10 minutes and is completely cured after heating for 30 minutes. The cured film is insoluble in acetone and 95% aqueous ethanol.

(b) One hundred parts of the crude interpolymerization reaction mixture from above is admixed with 20 parts of diethyl fumarate and evacuated to 50 parts of a clear syrup. One part of benzoyl peroxide is then added, and the mixture is cured in a plate mold by heating for 15 hours at 60° C. and then for two additional hours at 120° C. The resulting sheet is hard, colorless and not attacked by acetone.

Having thus described my invention, what I claim and desire to protect by Letters Patent is:

1. A method of preparing acetone-soluble ternary interpolymers which comprises heating, in the presence of a peroxidic compound catalyst, a ternary mixture of monomers consisting solely of diallyl fumarate, styrene, and a copolymerizable monomer of the formula $RCH=CR-CH_2X$ where one R is hydrogen and the other R is from the class consisting of alkyl, halogen, haloalkyl, and aryl; X being from the class consisting of alkoxy, alkenyloxy, aryloxy, aralkoxy, and saturated aliphatic acyloxy radicals, the proportions of the said monomers being from 2 to 10 molar equivalents of the said formulated copolymerizable compound, and from 0.2 to 6.0 molar equivalent of the styrene monomer per mole equivalent of the fumarate.

2. A method of making an acetone-soluble ternary interpolymer which comprises heating, in the presence of a peroxidic compound catalyst, a ternary mixture of monomers consisting solely of diallyl fumarate, styrene, and methallyl alkyl ether, the proportions being from 2–10 moles of the ether, and 0.2 to 6 moles of the styrene per mole of the fumarate.

PLINY O. TAWNEY.

REFERENCES CITED

The following references are of record in the file of this patent:

UNITED STATES PATENTS

| Number | Name | Date |
|---|---|---|
| 2,378,195 | D'Alelio | June 12, 1945 |
| 2,378,197 | D'Alelio | June 12, 1945 |
| 2,403,213 | D'Alelio | July 2, 1946 |
| 2,430,109 | D'Alelio | Nov. 4, 1947 |
| 2,431,373 | D'Alelio | Nov. 25, 1947 |